(12) United States Patent
Gieras

(10) Patent No.: US 10,355,568 B2
(45) Date of Patent: Jul. 16, 2019

(54) FLUX CONTROL OF PERMANENT MAGNET ELECTRIC MACHINE

(71) Applicant: Hamilton Sundstrand Corporation, Charlotte, NC (US)

(72) Inventor: Jacek F. Gieras, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 253 days.

(21) Appl. No.: 14/924,081

(22) Filed: Oct. 27, 2015

(65) Prior Publication Data

US 2017/0117786 A1   Apr. 27, 2017

(51) Int. Cl.
  *H02K 1/27*   (2006.01)
  *H02K 21/02*  (2006.01)

(52) U.S. Cl.
  CPC .......... *H02K 21/028* (2013.01); *H02K 1/278* (2013.01)

(58) Field of Classification Search
  CPC .............................. H02K 1/278; H02K 21/028
  USPC .............................................. 310/156.01, 268
  IPC .............................................. H02K 1/27,21/02
  See application file for complete search history.

(56) References Cited

U.S. PATENT DOCUMENTS

| 4,303,843 A | 12/1981 | Arnoux et al. |
| 5,691,587 A | 11/1997 | Lamb |
| 7,148,598 B2 | 12/2006 | Ionel et al. |
| 7,528,514 B2 * | 5/2009 | Cruz ....................... F16D 27/01 310/103 |
| 7,589,449 B2 * | 9/2009 | Kitamura ............. H02K 11/048 310/156.16 |
| 7,777,384 B2 | 8/2010 | Gieras et al. |
| 7,843,155 B2 | 11/2010 | Rozman et al. |
| 7,859,231 B2 | 12/2010 | Gieras et al. |
| 8,085,003 B2 | 12/2011 | Gieras et al. |
| 8,536,752 B2 | 9/2013 | Katsumata et al. |
| 8,754,558 B2 * | 6/2014 | Casas ....................... H02K 7/06 290/53 |
| 2006/0284580 A1 * | 12/2006 | Kitamura ............. H02K 11/048 318/268 |
| 2007/0241628 A1 | 10/2007 | Himmelmann et al. |
| 2007/0273234 A1 * | 11/2007 | Melfi ..................... H02K 1/278 310/156.53 |

(Continued)

FOREIGN PATENT DOCUMENTS

| JP | H0993846 A | 4/1997 |
| JP | 2001025190 A | 1/2001 |
| JP | 2004242462 A | 8/2004 |

OTHER PUBLICATIONS

Extended European Search Report for International Application No. 16195905.1, dated Mar. 13, 2017, 8 pages.

(Continued)

*Primary Examiner* — John K Kim
(74) *Attorney, Agent, or Firm* — Cantor Colburn LLP

(57) ABSTRACT

A permanent magnet electric machine includes a rotor including a plurality permanent magnets arranged around a central shaft and supported in an outer member and a stator surrounding the rotor and arranged to allow the rotor to turn within in inner diameter of it. The rotor includes one or more flux control elements disposed within the output member and moveably attached to the central shaft that move from an initial position when the rotor is rotating at a first rate and to a second position closer to the permanent magnets when the rotor is operating at a second rate, greater than the first rate.

16 Claims, 4 Drawing Sheets

(56) References Cited

U.S. PATENT DOCUMENTS

2008/0315714 A1\* 12/2008 Badey .................... H02K 1/243
  310/261.1
2012/0056502 A1\* 3/2012 Cai ...................... H02K 21/044
  310/181

OTHER PUBLICATIONS

J. F. Gieras, "PM Synchronous Generators with Hybrid Excitation Systems and Voltage Control Capabilities: a Review", International Conference on Electrical Machines, ICEM 2012, Marseille, France, 8 pgs.

\* cited by examiner

FLUX CONTROL OF PERMANENT MAGNET ELECTRIC MACHINE

BACKGROUND OF THE INVENTION

The subject matter disclosed herein relates to electric machines. More specifically, the subject disclosure relates to magnetic flux regulation of permanent magnet electric machines.

Permanent magnet electric machines such as motors and generators have been in use for many years. Permanent magnet machines have been favored over other types due to their efficiency, high power density, simplicity, robustness and tolerance to large radial air gaps between the rotor and the stator of the machine.

In operation, the EMF per phase of an a.c. electrical machine is expressed by the following equation:

$$E = \pi\sqrt{2} f N k_w \Phi = \pi\sqrt{2} n p N k_w \Phi \quad (1)$$

where f is the frequency, N is the number of turns per phase, $k_w$ is the winding factor and $\Phi$ is the main magnetic flux. The frequency is a function of the speed n in rev/s and the number of pole pairs p, i.e.:

$$f = np \quad (2).$$

For constant magnetic flux ($\Phi$=const) and constant number of turns per phase (N=const) the EMF (E) is a function of speed. The higher the speed, the higher the EMF and vice versa. In standard PM brushless machines there is no possibility to control the magnetic flux $\Phi$. Thus, the faster the rotor turns, the greater the EMF induced in the stator windings of the machine.

So-called flux regulated generators/motors have magnetic flux diverters or additional windings or both. By diverting the PM magnetic flux or changing the current in a control winding, the main magnetic flux of PMs linked with the armature winding can be reduced or magnified to control the EMF. The same principle can be used in flux-weakening PM brushless motors used, e.g., in electric vehicles. When the speed is high, the magnetic flux must be reduced

BRIEF DESCRIPTION OF THE INVENTION

According to one aspect of the invention, a permanent magnet electric machine includes a rotor including one or more permanent magnets arranged around a central shaft and supported in an outer member and a stator surrounding the rotor and arranged to allow the rotor to turn within in inner diameter of it. The rotor includes a plurality of flux control elements disposed within the output member and moveably attached to the central shaft that move from an initial position when the rotor is rotating at a first rate and to a second position closer to the permanent magnets when the rotor is operating at a second rate, greater than the first rate.

In another embodiment, a rotor for a permanent magnet electric machine includes a central shaft, an outer member surrounding the central shaft and a plurality permanent magnets arranged around a central shaft and supported in the outer member. The rotor also includes one or more flux control elements disposed within the output member and moveably attached to the central shaft that move from an initial position when the rotor is rotating at a first rate and to a second position closer to the permanent magnets when the rotor is operating at a second rate, greater than the first rate.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
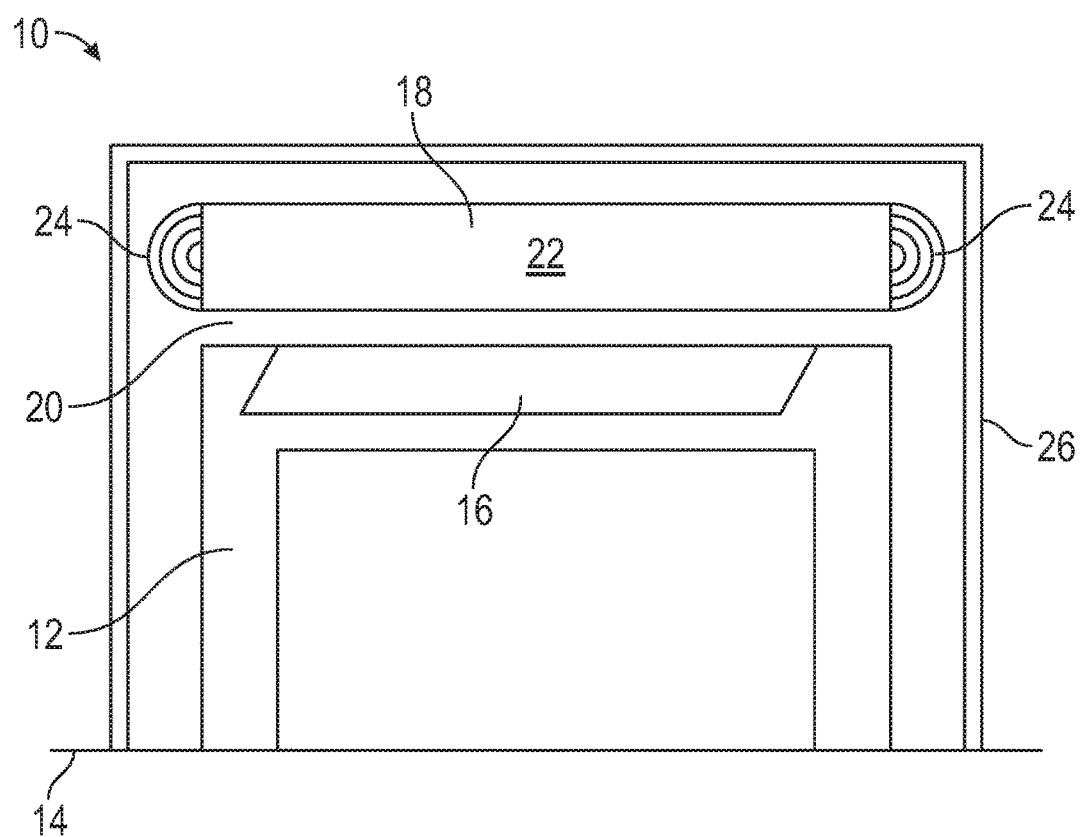
FIG. 1 is an axial section of an embodiment of a permanent magnet electric machine.

Shown in FIG. 1 is an axial section of a permanent magnet electric machine 10. The electric machine 10 includes a rotor assembly 12 rotatably located at an electric machine axis 14. The rotor 12 includes a plurality of permanent magnets 16. A stator 18 is located radially outboard of the rotor 12 defining a radial air gap 20 between the stator 18 and the rotor 12. The stator 18 includes a stator core 22 and a plurality of stator windings 24 extending through the stator core 22 which are magnetically interactive with the permanent magnets 16. The rotor 12 and stator 18 are located inside of a housing 26 which seals the electric machine 10 from the outside environment. As discussed above, rotation of the rotor 12 causes the magnets therein to induce an EMF in the windings that can feed an electric load (operating as a generator) or the windings can be fed with electrical energy (operating as a motor). In the general sense, the faster the rotor 12 rotates, the greater the output EMF of the machine 10. However, in some cases such may not be desired.

Disclosed herein is an electric machine that included moveable flux control elements disposed within an interior of the rotor 12. As discussed below, these elements can be used to reduce the flux in the stator windings and, as such, to limit or otherwise regulate the EMF produced even as the rotor speed increases. In particular, the elements may cause flux of permanent magnets that would otherwise penetrate in the stator to leak into the flux control elements and, as such, keep the EMF and resultant output current more constant that if the magnets were not provided.

In one or more embodiments, the magnetic flux can be controlled automatically, without any power electronics controllers. This may be accomplished by providing a so called centrifugal clutch within the rotor.

Figure 2A:
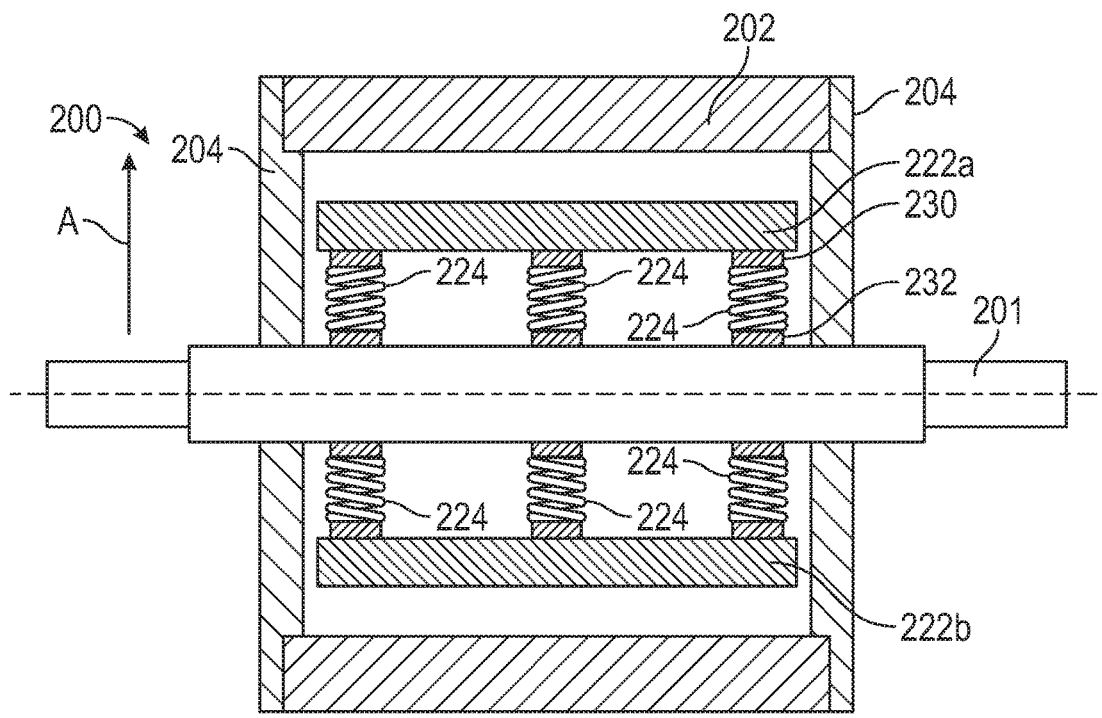
FIGS. 2A and 2B show axial and cross-sections of a rotor according to one embodiment.
Figure 2B:
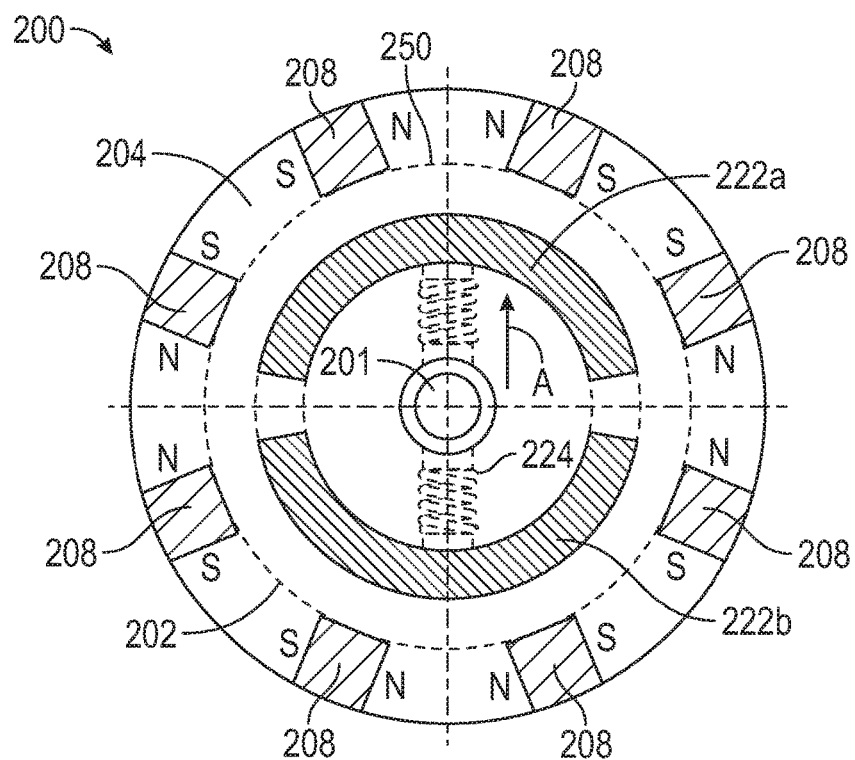

FIGS. 2A and 2B show, respectively, axial cross-section and an end view of an example of rotor 200 according to one embodiment. The rotor 200 includes a central shaft 201. An outer member 202 is fixedly attached to the central shaft 202 by two or more non-ferromagnetic support structures 204. In one embodiment, the support structures 204 are formed as disks. In FIG. 2B elements not visible through the support structures are shown in phantom.

The outer member 202 may be formed of a ferromagnetic material such as mild steel. Any rotation of the central shaft 201 results in the same rotation of the outer member 202. The outer member 202 is generally tubular in shape and has a plurality of permanent magnets 208 disposed and retained axially along at least a portion of its length therein. In FIG. 2B, eight permanent magnets 208 are shown but this number is provided by way example and any number of permanent magnets two or greater may be provided. The polarity of the each of the permanent magnets 208 is shown in FIG. 2B and is well known in the art and, thus, the orientation and arrangement of the magnets is not discussed further herein.

The rotor 200 also includes two or more flux control elements 222a, 222b disposed between the central shaft 201 and the outer member 202. In one embodiment, the flux control elements 222a, 22b are formed of a ferromagnetic material. As shown, the first and second flux control elements 222a, 222b are almost half arcs but the exact shape can be varied without departing embodiments disclosed herein.

As illustrated, elastic members 224 couple the flux control elements 222a, 22b to the central shaft 201. Also illustrated, but not required, are connection elements 230, 232 that are fixedly attached, respectively, to the outer flux control elements 222a, 222b and the central shaft 201. As illustrated, the elastic members are coil springs This is not meant as limiting and any element that allows the inner magnets to move outwardly (e.g., in direction A) as the rotation of the speed of the central shaft 201 increases. Preferably, the elastic members 220 will also cause the flux control elements 222 return back to an original position (e.g., closer to the central shaft 201 as speed decreases. Also, the number of elastic members 224 can be any number one or greater.

Figure 3A:
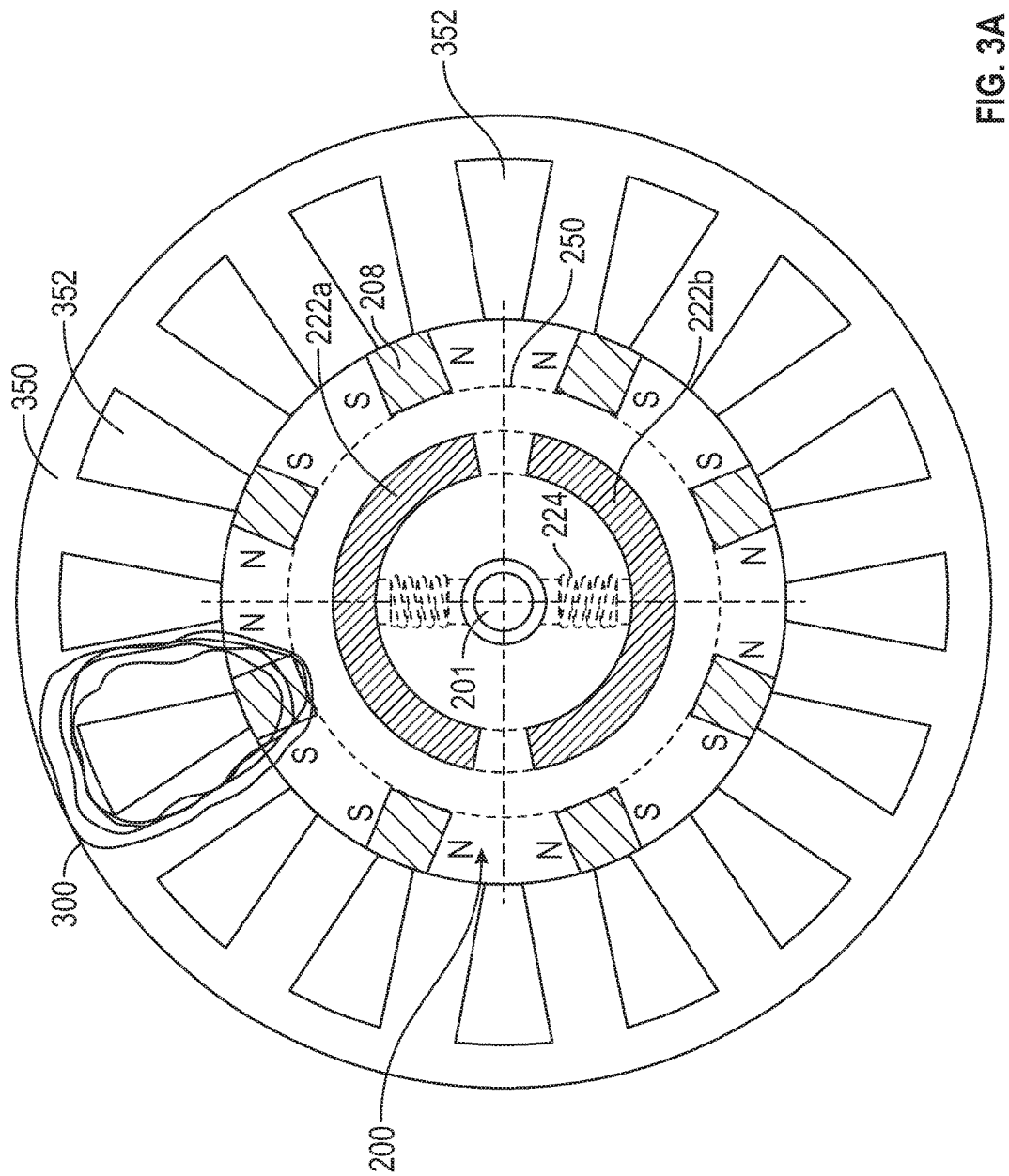
FIGS. 3A and 3B show the rotor of FIG. 2 within a stator and, respectively, with the flux control elements in an initial position and an extended position.
Figure 3B:
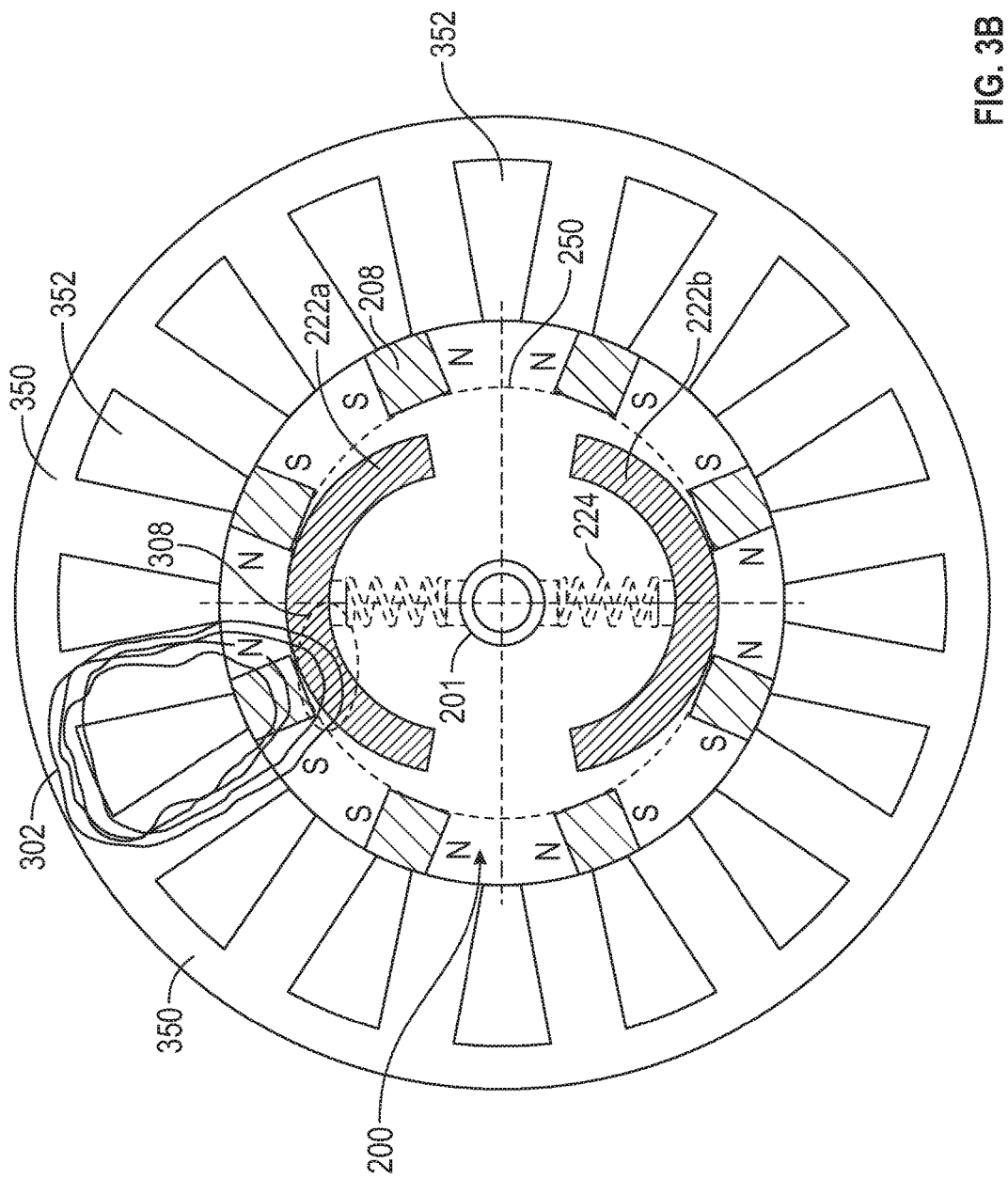

FIGS. 3A and 3B show a general stator 350 surrounding a rotor 200 with the flux control elements 222a, 222b in, respectively, initial and fully extended positions. The stator 350 includes slots 352 to receive stator windings (not shown). In more detail, as the rotational speed of the central shaft 201 increases, the flux control elements 222a, 222b move outwardly from the initial resting location (FIG. 3A) towards and eventually into contact with or within a predefined distance from the permanent magnets 208 (FIG. 3B). Stated differently, the flux control elements 222a, 222b move outwardly away from the central shaft 201 as speed increases (FIG. 3B) towards and back towards it when speed decreases. The furthest outwardly extended position may an inner radius of the permanent magnets 208. This inner radius is shown by dashed line 250 in FIGS. 2b and 3A-3B.

The radial displacement of the flux control elements 222a, 222b may be described, in one embodiment, by a differential equation with respect to the radial direction as follows:

$$M\frac{d^2A}{dt^2} = F_m + F_c - F_{el} \quad (3)$$

where M is the equivalent mass, $F_m$ is the attractive force between magnets 208 and the flux control elements 222a, 222b, $F_e$ is the centrifugal force and $F_{el}$ is the elastic force exerted inwardly toward the central shaft 201 by the elastic members 224.

FIGS. 3A and 3B show flux lines 300. These flux lines 300 are shown for example and discussion only. As the flux control elements 222a, 222b move outwardly some of the flux may leak into them. This is illustrated in FIG. 3B by leakage flux 302. The closer the flux control elements 222a, 222b get, the more flux leaks into them (e.g., the leakage flux 302 increases). This can allow for a more constant EMF in the stators, even as speed increases.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A permanent magnet electric machine comprising:
    a rotor including a plurality of permanent magnets arranged around a central shaft and supported in an outer member;
    a stator surrounding the rotor and arranged to allow the rotor to turn within in inner diameter of it;
    wherein the rotor includes one or more flux control elements disposed within the output member and moveably attached to the central shaft that move from an initial position when the rotor is rotating at a first rate and to a second position closer to the permanent magnets when the rotor is operating at a second rate, greater than the first rate, the one or more flux control elements comprising almost half circle arcs.

2. The permanent magnet electric machine of claim 1, further comprising:
    non-ferromagnetic support structures coupling the outer member to the central shaft.

3. The permanent magnet electric machine of claim 2, wherein the outer member is formed of a ferromagnetic material.

4. The permanent magnet electric machine of claim 3, wherein the ferromagnetic material is mild steel.

5. The permanent magnet electric machine of claim 1, wherein the flux control elements are formed of a ferromagnetic material.

6. The permanent magnet electric machine of claim 5, wherein the flux control elements are coupled to the central shaft by one or more elastic members.

7. The permanent magnet electric machine of claim 6, wherein the one or more elastic members are springs.

8. The permanent magnet electric machine of claim 6, wherein the flux control elements move from the second position back towards the first position when the rotation of the central shaft decreases from the second rate.

9. A rotor for a permanent magnet electric machine comprising:
    a central shaft;
    an outer member surrounding the central shaft;
    a plurality of permanent magnets arranged around a central shaft and supported in the outer member;
    one or more flux control elements disposed within the output member and moveably attached to the central shaft that move from an initial position when the rotor is rotating at a first rate and to a second position closer to the permanent magnets when the rotor is operating at a second rate, greater than the first rate, the one or more flux control elements comprising almost half circle arcs.

10. The rotor for a permanent magnet electric machine of claim 9, further comprising:
    non-ferromagnetic support structures coupling the outer member to the central shaft.

11. The rotor for a permanent magnet electric machine of claim 10, wherein the outer member is formed of a ferromagnetic material.

12. The rotor for a permanent magnet electric machine of claim 11, wherein the ferromagnetic material is mild steel.

13. The rotor for a permanent magnet electric machine of claim 9, wherein the flux control elements are formed of a ferromagnetic material.

14. The rotor for a permanent magnet electric machine of claim 13, wherein the flux control elements are coupled to the central shaft by one or more elastic members.

15. The rotor for a permanent magnet electric machine of claim 14, wherein the one or more elastic members are springs.

16. The rotor for a permanent magnet electric machine of claim 14, wherein the flux control elements move from the second position back towards the first position when the rotation of the central shaft decreases from the second rate.

* * * * *